United States Patent [19]
Boissie et al.

[11] Patent Number: 5,980,761
[45] Date of Patent: Nov. 9, 1999

[54] FILTER SYSTEM AND A CARTRIDGE CONTAINING A CELLULAR GRANULAR MATERIAL

[76] Inventors: Chantal Boissie, 6, rue de la Republique, 13380 Plan de Cuques; Déborah Lucenet; David Lucenet, both of 19, rue Barthélémy - Niolon, 13710 Fuveau; Nicolas Satz, 42, rue Renoir, 84300 Draguignan, all of France

[21] Appl. No.: 09/047,720

[22] Filed: Mar. 25, 1998

[30] Foreign Application Priority Data

Apr. 11, 1997 [FR] France .................................. 97 04725

[51] Int. Cl.$^6$ .......................... B01D 39/06; B01D 24/04
[52] U.S. Cl. ........................ 210/807; 210/800; 210/169; 210/265; 210/282; 210/290; 210/416.2
[58] Field of Search .................................. 210/169, 282, 210/290, 265, 266, 416.2, 503, 196, 776, 800, 807

[56] References Cited

U.S. PATENT DOCUMENTS

| | | | |
|---|---|---|---|
| 3,618,774 | 11/1971 | Delphia | 210/169 |
| 4,108,775 | 8/1978 | Wilkes et al. | 210/169 |
| 5,584,992 | 12/1996 | Sugimoto | 210/169 |
| 5,705,001 | 1/1998 | Iwata et al. | 156/622 |

FOREIGN PATENT DOCUMENTS

| | | |
|---|---|---|
| 0517236 | 8/1996 | European Pat. Off. . |
| 2502508 | 10/1982 | France . |
| 0634952 | 5/1995 | France . |
| 2730485 | 8/1996 | France . |
| 2744154 | 8/1997 | France . |
| 1429527 | 3/1976 | United Kingdom . |

*Primary Examiner*—Jay H. Woo
*Assistant Examiner*—Frank M. Lawrence, Jr.
*Attorney, Agent, or Firm*—Ladas & Parry

[57] ABSTRACT

The main application of the invention lies in making cartridges, filters and complete filter systems for regeneration purposes, in particular for regenerating swimming pool water, and for that purpose it comprises at least a system for physically treating water by means of an inert granular material enclosed in at least one envelope through which said water can flow, passing through said material; according to the invention, the material is of cellular structure, having relative density of less than 1, and is constituted by pozzolan having a grain size that is less than or equal to 25 mm.

15 Claims, 8 Drawing Sheets

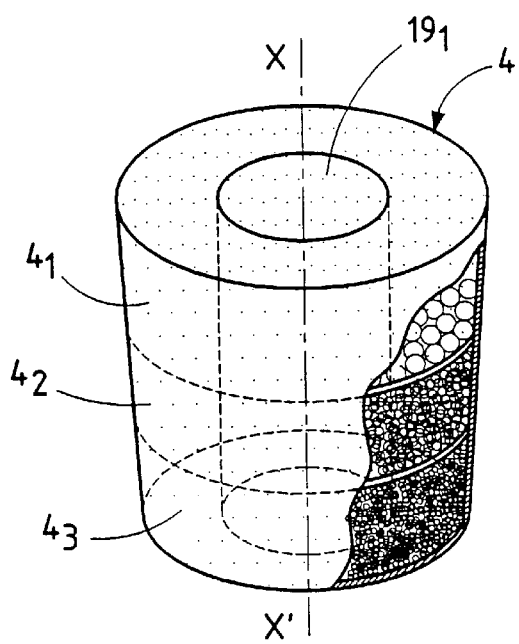
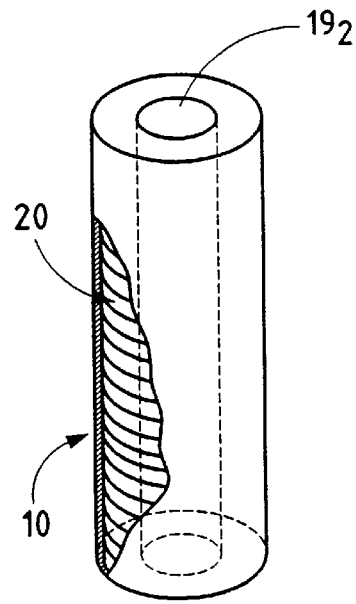
FIG.4
FIG.5
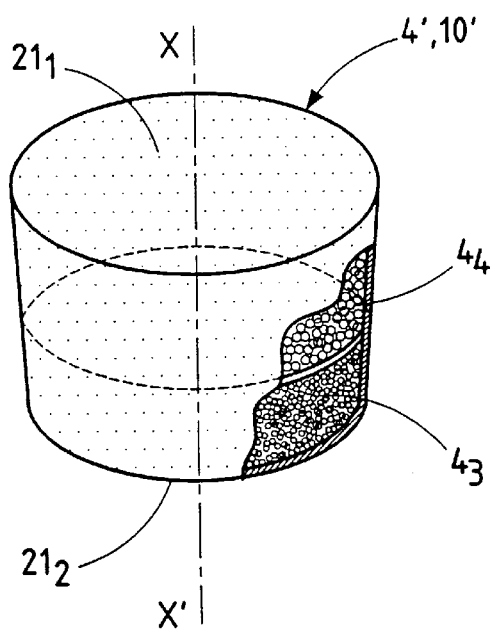
FIG.6

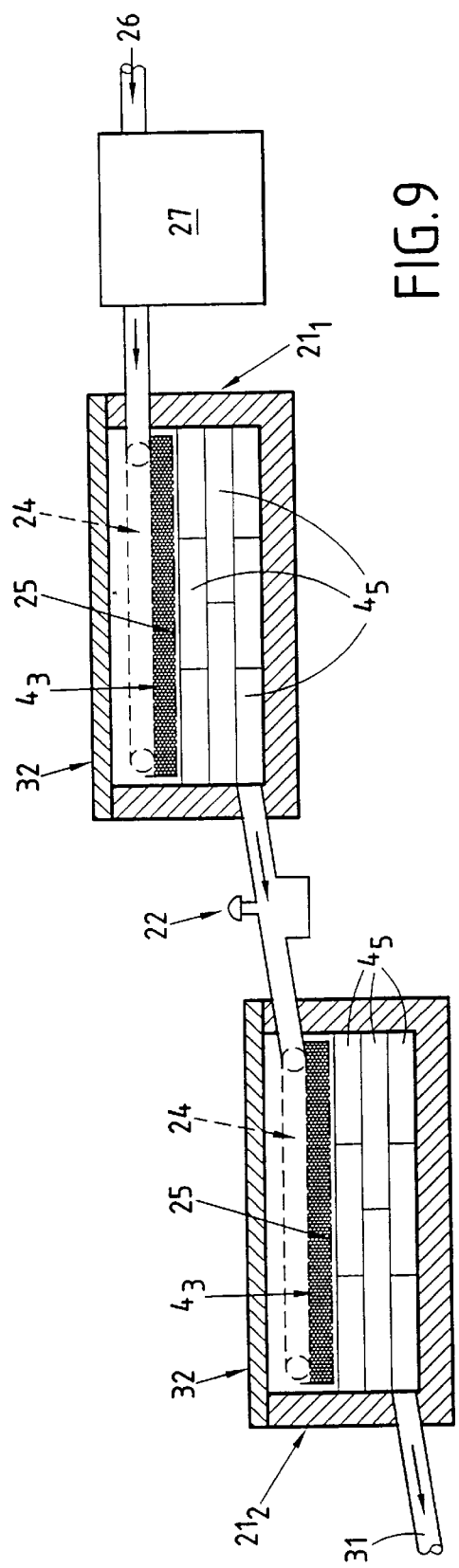
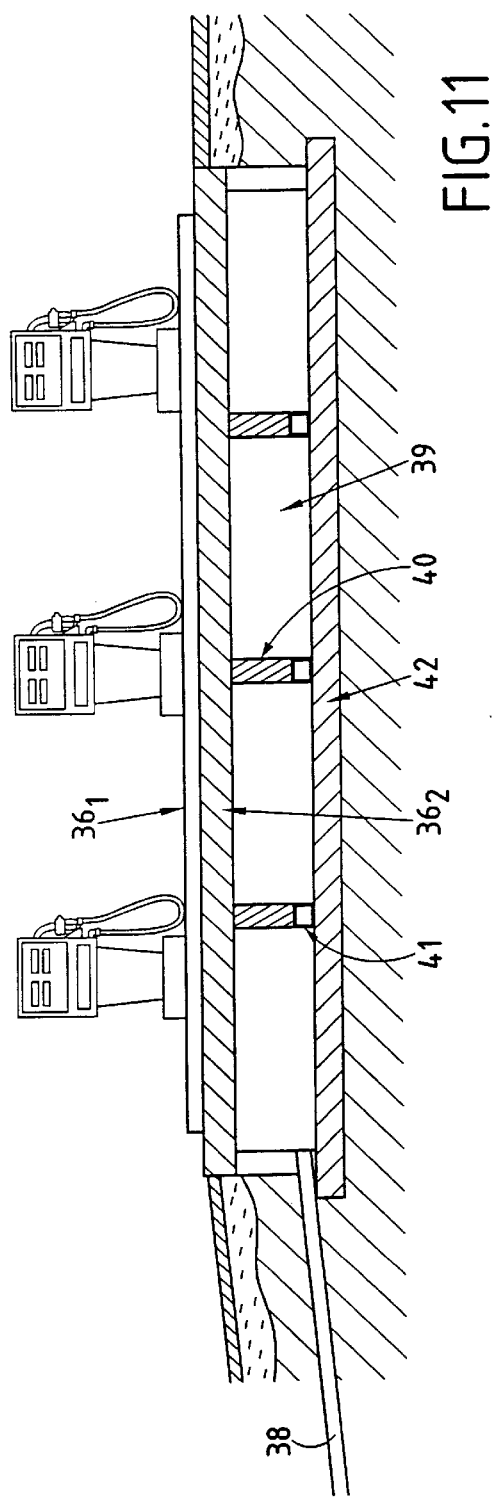

FILTER SYSTEM AND A CARTRIDGE CONTAINING A CELLULAR GRANULAR MATERIAL

FIELD OF THE INVENTION

The present invention relates to filter systems and to cartridges containing a cellular granular material.

The technical field of the invention is that of methods of separating fluids and solids, with filtering being performed by a non-agglomerated filter substance.

One of the applications of the invention lies in making filter cartridges and complete filter systems for regenerating swimming pool water so as to be able to continue using the same water while keeping it in a satisfactory state of cleanness; other applications are also possible, such as treating rainwater before rejecting it into the natural environment, filtering household waste water, and whenever any kind of effluent is to be subjected to physical treatment. By way of non-limiting example, mention can be made of: filtering effluent for freestanding septic tank systems, for individual or multiple dwellings, effluent from waterworks, effluent from storm basin outlets, effluent recovered from fuel distribution areas or the outlets of hydrocarbon separators, leech water before chemical treatment, and fluid animal waste (pig manure, bird droppings, . . . ) likewise prior to chemical treatment, . . . . Embodiments of some of these are described below.

BACKGROUND OF THE INVENTION

At present there exist various types of filter system, generally made up of successive beds of filter elements, such as described, for example, in French patent application FR 2 502 508 filed on Mar. 30, 1981 for "A filter structure, a method of making such structures, and an ultrafiltration device", essentially comprising a porous support of sintered material having relatively large grains, carrying a thinner filter layer of a material that is also sintered but using relatively small grains, . . . . Mention may also be made of European patent application EP 0 634 952 filed under German priority of Apr. 6, 1992 and entitled "A filter element with a permeable and porous undeformable body made of plastics material" . . . .

Naturally, mention can also be made of other filter devices such as those in swimming pool water regeneration circuits which make use essentially of sand: the sand is placed in reservoirs through which the water is caused to flow, but with the drawbacks firstly that sand has high relative density, and secondly that it becomes compacted, thus requiring the water flow direction to be reversed rather frequently since otherwise the porosity of the sand decreases, increasing headloss through the circuit while greatly decreasing its effectiveness.

Also, to make filter cartridges such as those mentioned and described in the above patent applications, special materials are used which are quite expensive to manufacture and implement, but without that giving rise to satisfactory retention efficiency regardless of the elements in suspension in the fluid passing through them, except by decreasing the porosity of said filter. Unfortunately, that also increases the headloss in fluid circulation circuits, thus requiring installations that are large.

The problem posed is thus to be able to make filter systems for physically treating a fluid while using a material which is very cheap to implement, which is inert relative to the fluid it is to filter, and which is capable of retaining a maximum quantity of elements that are in suspension therein, while having porosity through which the fluid passes that is not so small as to increase headlosses excessively, and which is easy to implement, e.g. by being incorporated in any already-existing circuit, or by being used on a site where the filter system must be capable of being buried or located in a closed shelter.

OBJECTS AND SUMMARY OF THE INVENTION

A solution to the problem posed is a filter system for physically treating fluid, and comprising an inert granular material enclosed in at least one envelope through which said fluid can circulate, passing through said material, where the material is of cellular structure, of relative density less than 1, and is pozzolan having a grain size that is less than or equal to 25 mm, and preferably less than 20 mm.

In the present invention, said envelope is a filter cartridge having at least two parallel perforated faces, the pozzolan filling said cartridge being disposed in at least one layer parallel to its faces and perpendicular to the axis on which the fluid arrives; said filter system preferably includes at least two cartridges having pozzolan of different grain sizes, one which is disposed ahead of the other relative to the direction in which the fluid arrives being constituted by a sand having fine grains of a grain size smaller than or equal to 4 mm, and preferably equal to 2 mm, and the other being constituted by grains having a grain size less than or equal to 25 mm, and preferably lying in the range 2 mm to 20 mm, with at least the latter layer being contained in said filter cartridge.

In a particular use, such a filter system of the invention is included in a circuit for regenerating and recycling the water contained in a storage reservoir and including at least one circulation pump; said water storage reservoir may be a swimming pool as described below with reference to FIGS. 1 to 3: the water taken in by said pump is then passed via a duct whose orifice is located level with the surface of the water in the pool and includes a basket that acts as a screen for recovering waste; in accordance with the invention, the basket includes a filter cartridge of outside shape that is symmetrical about the axis on which the fluid arrives in said basket, and the pozzolan filling said cartridge is disposed as specified above in at least one and preferably two layers perpendicular to said axis, one for stopping very fine particles being constituted by fine grains of grain size smaller than or equal to 4 mm, and preferably less than 2 mm, and the other being made up of grains having a size less than 25 mm, and preferably lying in the range 2 mm to 20 mm, more preferably still in the range 2 mm to 15 mm, or even in the range 2 mm to 6 mm. This grain size is defined by the need to find a balance between filtering efficiency which naturally increases with decreasing grain size since a given volume of material then has greater total surface area in contact with the fluid passing between the grains (for example a grain size of 20 mm to 50 mm gives a specific contact area of about 200 $m^2$ per $m^3$ of pozzolan, whereas a grain size of 50 mm to 100 mm gives a specific surface area of 100 $m^2$ per $m^3$), and the headlosses that arise in the circuit, which headlosses increase simultaneously and must be kept down since otherwise the flow rate will be decreased and thus the fluid recirculation rate will also be decreased, unless the power of the pump is increased. Thus, in the present invention it is preferable to use two types of grain size disposed in series in particular to combine and obtain the best compromise between a large exchange area and a reduction in headloss. The person skilled in the art is capable under such circumstances of finding the best compromise for an installation under consideration by taking the present description into account.

In other embodiments, such as those described below with reference to FIGS. 7 to 12 and corresponding to other applications, even though the cartridges are defined and the pozzolan grain sizes are selected as specified above, the filter cartridges may be boxes of the kind described in French patent application FR 2 744 154 as published on Aug. 1, 1997 under the title "A box, an insulating system and a ground drainage system" filed by Mrs. Chantal BOISSIE, Mrs. Déborah LUCENET and Mr. David LUCENET.

In which case the filter system of the invention includes at least one leakproof tank containing a plurality of superposed layers, e.g. about ten, of filter cartridges thus giving a total height of about 1.20 m to 1.50 m. In a preferred embodiment, the filter system of the invention thus comprises at least two such tanks connected in series and included in an effluent filter circuit: filtering is provided essentially by effluent percolating through the pozzolan; it flows under gravity through at least one of said tanks.

The result is firstly novel filter systems and novel filter cartridges responding to the problem posed while avoiding the drawbacks of present filters, and secondly a novel use of pozzolan which is indeed a known material but which is used in this case as the only material which performs filtering of a fluid, being disposed in at least one closed envelope through which said fluid passes, passing through the pozzolan which is of a mean grain size that is less than or equal to 25 mm, or even 20 mm, and in which the size of the grains is calibrated depending on the desired target filtering efficiency.

Pozzolan is a variety of rock of volcanic origin that is cellular in structure, made of ash that remains in the mobile state, and that is to be found in very large quantities in volcanic ranges and which is therefore of relatively low cost. Its mechanical characteristics are also very favorable for making filters of the invention: its relative density is quite low, being of the order of 0.980 on average, because, amongst other reasons, of its peculiar porosity due to vacuoles, some of which are closed. In addition, the size of the vacuoles is greater than 100 microns, thereby giving the pozzolan, via its open vacuoles, firstly a high degree of permeability with low ability to retain water, and secondly a total internal porosity (taking air and water porosity into account) of the order of 12% to 16% relative to the overall volume occupied by the material for grain sizes lying respectively in millimeter ranges 2/5 to 10/15. Since the total external porosity, taking account of the spaces between the grains, is of the order of 52% to 62% for grains in the same size ranges, the resulting total porosity is of the order of 68% to 74%, and is practically constant in the range of grain sizes under consideration, and indeed beyond said range.

As a result, this very high porosity associated with a likewise high level of roughness and large specific surface area of pozzolan, makes it an excellent filter material in a manner that is novel and unexpected, in particular when implemented in the manner specific to the invention, thus enabling various elements in suspension in the fluid that is to be filtered to be caught and retained in the pozzolan through which the fluid itself passes quite easily, with this being achieved by selecting a strictly controlled grain size that is appropriate to the nature of the effluent to be filtered, and disposing it in the manner specified by the present invention, regardless of whether the circuit is closed or open.

In addition, pozzolan is a volcanic siliceous rock and is thus thoroughly inert, with the crystal fraction thereof constituting 80% to 100% of its solid volume, depending on the deposit from which it is taken, and with the remainder being essentially vitreous, and likewise inert. In addition to being rich in silica, pozzolans also contain oligo-elements which make it possible to obtain better quality water after filtering, in addition to the effectiveness of the physical treatment. Natural mineral waters from volcanic regions are known to pick up such oligo-elements.

Although pozzolan is itself a known substance that has been used since Roman times, its known use is essentially as an aggregate or binder, and numerous patent applications have been filed in that respect, with an example thereof being given by recent French patent application FR 2 730 485 filed on Feb. 10, 1995.

Pozzolan is also mentioned for use in slow filter beds, but in combination with other minerals, e.g. as described in European patent application EP 0 517 236 filed on Jun. 5, 1992, but until now it has never been used firstly on its own as a filter element in fast circulation circuits, and secondly in closed boxes for treating effluent in the embodiment and the main applications of the invention which are regenerating water such as swimming pool water, filtering household waste water, treating effluent such as rainwater, fluid animal waste, water that has filtered from fuel dispensing zones, . . . , as mentioned in the introduction.

Other advantages of the present invention could be mentioned, however those mentioned above already suffice to demonstrate the novelty and the use of the invention.

BRIEF DESCRIPTION OF THE DRAWINGS

The description and the figures below give implementations and embodiments of the invention that are not limiting in any way: other embodiments are possible in the ambit of the scope and the extent of the invention, in particular by changing the shapes of the enclosures and the filter cartridges containing said pozzolan.

FIGS. 4 to 6 are perspective views, partially in section, showing embodiments of filter cartridges of the invention.

FIG. 9 is a diagrammatic section view of a filter installation as shown in FIG. 7, but simplified for use in the treatment of effluent from a waste water pit, for treating waste water coming from a laundry, a kitchen, etc.

FIGS. 10 and 11 are diagrammatic section views of filter systems adapted to effluent coming from rainwater that has come off the forecourt of a fuel dispensing station.

MORE DETAILED DESCRIPTION

Figure 1:
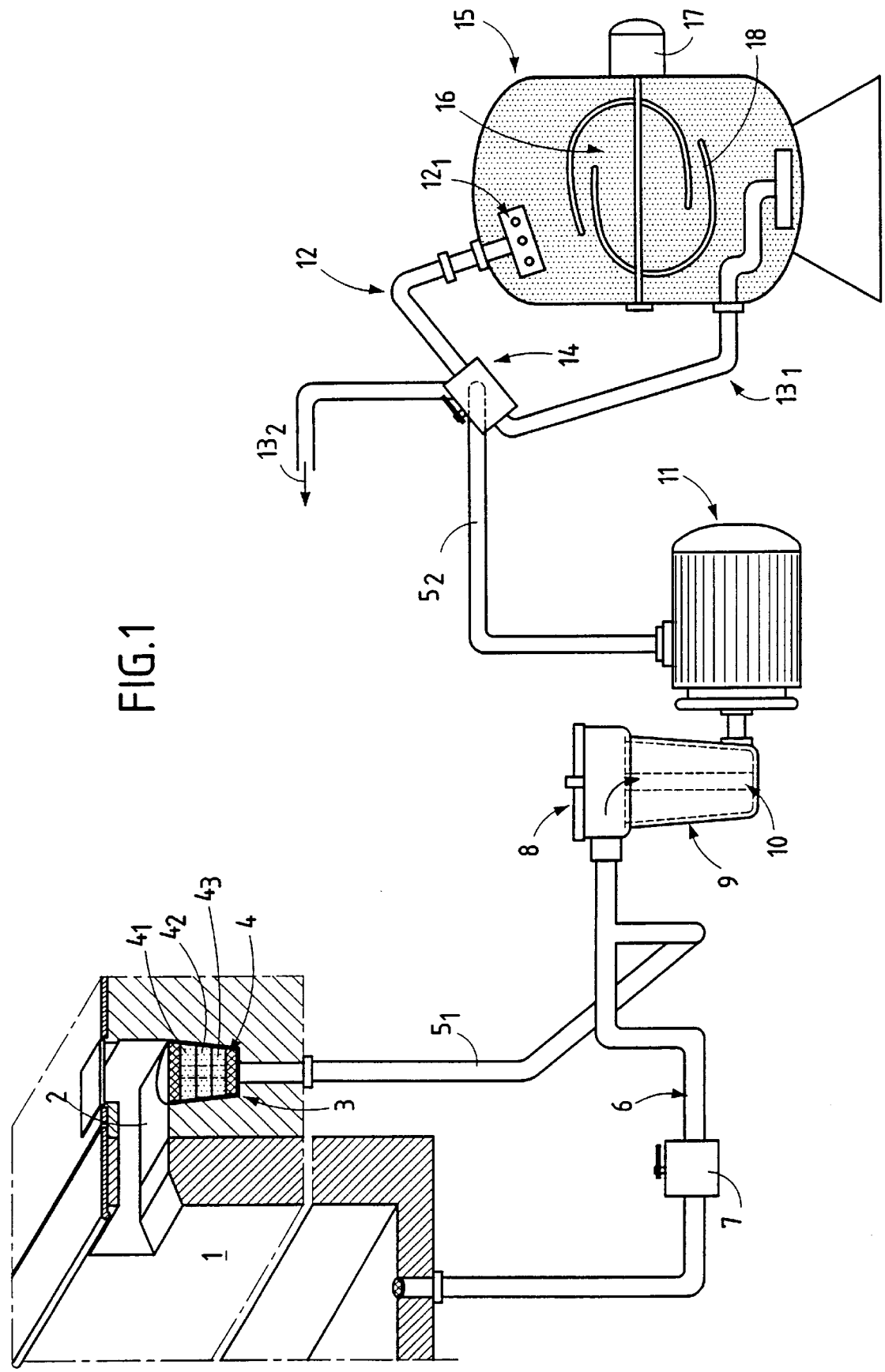
FIG. 1 is a diagrammatic view of a regenerator circuit comprising filter elements of the invention for an application to treating water from a reservoir such as a swimming pool.
Figure 2:
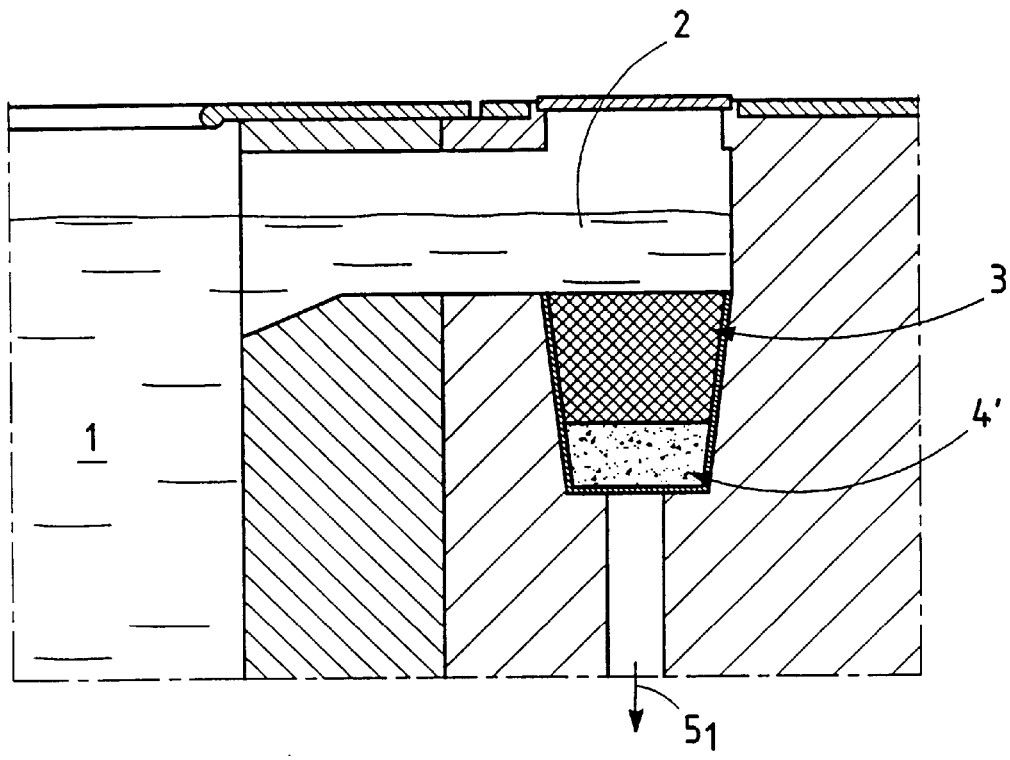
FIG. 2 is a fragmentary section of a skimmer duct for taking water from a swimming pool.
Figure 3:
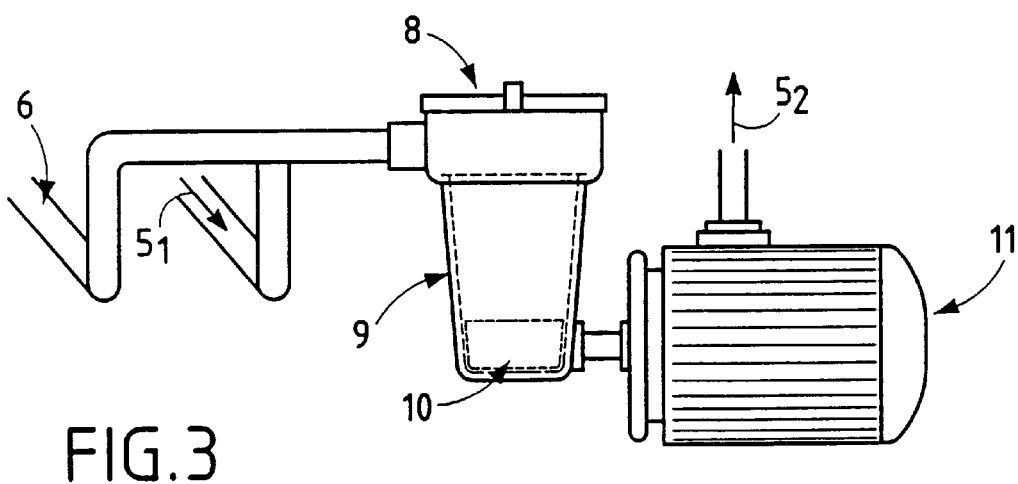
FIG. 3 is a fragmentary view of the circulation pump of the FIG. 1 circuit connected downstream from a prefilter of the invention.

The family of filter systems for physically treating fluid to which the present invention applies covers all those that include inert granular materials enclosed in at least one envelope 4, 10, 15 through which the said fluid can flow, so as to pass through said material.

In the present invention, the above-described material of cellular structure having relative density of less than 1, of 0.980 on average, is pozzolan $4_2$, $4_3$, $4_4$ having a mean grain size that is less than or equal to 25 mm and preferably 20 mm or even 15 mm.

As shown in FIGS. 4 and 6, said envelope 4, 4', 10' is a filter cartridge of outside shape that is symmetrical about an axis XX' and that is preferably cylindrical or frustoconical, with the pozzolan filling said cartridge being disposed in at least one and preferably in two superposed layers of different grain sizes perpendicularly to the axis XX', which axis XX' is the axis on which the fluid penetrates into said cartridge, and the outside surfaces thereof perpendicular to said axis XX' are perforated; thus, if there are two layers, one of them $4_3$ can be constituted by fine grains of grain size smaller than or equal to 4 mm or even 2 mm, while the other layer $4_2$, $4_4$ is made up of grains having a grain size that is smaller than 25 mm, e.g. lying in the range 2 mm to 20 mm, and preferably in the range 2 mm to 15 mm, or even in the range 2 mm to 6 mm: grain size order relative to fluid circulation direction is irrelevant when forced circulation is in use.

As shown in FIG. 4, filter cartridge 4 comprises a hollow passage 19 on its axis XX' for fluid circulation, and the surfaces of this hollow passage and of the outside shape of the envelope of the cartridge are perforated, thereby enabling the fluid to flow from the passage 19 towards the periphery of the cartridge perpendicularly to the axis XX'; in addition, the fluid can pass through said cartridge along the axis XX'.

The pozzolan cartridge 4, 4' placed in said skimmer basket 3 or in any other surface water recovery gulley, serves to retain elements that are much finer than those retained by the basket itself and which are in suspension in the water of the pool 1, such as small algae, pollen, suntan oil, small insects, silt, etc. In its top portion, said cartridge 4, 4' may also have a layer $4_1$ of chlorine pebbles for treating the water chemically in addition to the physicochemical treatment provided by the pozzolan.

For such cartridges 4, 4' used at the beginning of the filter circuit and having the inlet orifice of the intake circuit $5_1$ disposed vertically beneath the basket 3, the hollow passage $19_1$ which is then situated vertically on the axis of said orifice of the duct $5_1$ is of smaller diameter so as to force a portion of the flow to pass through the filter cartridge surrounding said passage while allowing a portion of the fluid to pass without being filtered by the pozzolan, but after being filtered coarsely only by the basket 3 so as to avoid disturbing water circulation through the treatment system.

However, as shown in FIG. 6, if increasing headloss in said circuit does not constitute a limit, or if pozzolan is used that is of relatively large grain size, then the filter cartridge 4' or 10' need not have such a central passage $19_1$, and the peripheral outer surface can be leakproof or otherwise, while the opposing faces 21 on axis XX' are necessarily perforated to allow the said flow along said axis XX' and through the entire section of the cartridge.

Depending on their basic function, such cartridges as shown in FIG. 4 or 6 are designed to be installed:

either in the basket 3 for recovering and retaining floating waste, such as leaves or other objects of relatively large size that may become deposited on the surface of the basin 1 such as the pool shown in FIG. 1;

or else in the basket 9 of the prefilters 8 which, in the water treatment circuit, precede the circulation pump 11 and the filter 15 proper.

These cartridges 4, 4', or 10' can be made using an outer envelope of high relative density polyethylene of a shape corresponding to the intended function thereof, which is preferably circularly cylindrical or frustoconical. These envelopes are filled with pozzolan to a strictly controlled grain size.

The cartridge 10, 10' of the prefilter 8 situated upstream from the circulation pump 11 performs the same function as the above cartridge, but acts in addition thereto: depending on the particular installation, it can be necessary to have different grain sizes in these two prefilter cartridges placed on the filter circuit $5_1$ in order to avoid disturbing the hydraulic system.

In the example shown in FIG. 5, the prefilter cartridge 10 may be a filter cartridge whose outside shape is symmetrical about its axis XX', i.e. preferably circularly cylindrical, and which is made up of layers of porous envelopes filled with pozzolan fines having a grain size smaller than or equal to 4 mm and preferably less than 2 mm: also, in the center thereof on the axis XX' there is a hollow passage $19_2$ enabling the water flow section through the envelopes to be increased, with the water thus penetrating via the orifice $19_2$ and circulating towards the periphery of the cartridge 10 to be evacuated along a duct disposed perpendicularly to the axis XX' at the periphery of the cartridge 10 in the wall of the receptacle 8 which contains it and located remote from the orifice through which the fluid penetrates into the receptacle.

The filter capacity of such filters 4, 4', 10, 10', and that of the filter 15 described below, is thus due to the specific structure of pozzolan and to its physico-chemical properties as outlined in the introduction.

In the portion $5_2$ of the filter circuit situated downstream from the pump 11, the filter system comprises a sealed capacity constituting an envelope 15: this has at least one fluid inlet orifice 12 that is preferably provided with a diffuser $12_1$, for distributing said fluid over the entire area of the filter section and situated near one end, preferably a top end, and an outlet orifice $13_1$, situated towards its opposite, other end i.e. preferably near the bottom thereof, and likewise preferably fitted with a manifold for taking up fluid over a maximum area of the filter flow section; the capacity 15 is filled with pozzolan grains 16 having a grain size that is less than or equal to 15 mm, and preferably less than 20 mm, i.e. preferably a mixture of grain sizes corresponding to the two types used for the layers described in the prefilter cartridges 4, 4', 10', i.e. 0 to 2 mm or 0/2 corresponding to pozzolan fines, and 2/6 or 5/10, 10/15 up to 10/25 (all dimensions in mm) for pozzolan having grain of rice or gravel sizes respectively; in addition, said sealed capacity has at least one internal mixer arm 18 driven by an external motor 17 and situated between the inlet and outlet orifices in order to homogenize the pozzolan 16 either continuously or on demand.

In addition to the special properties of pozzolan as outlined above, another advantage of pozzolan in such a filter 15, when compared with sand which is generally used in swimming pool water treatment circuits, lies in the fact that pozzolan does not become compacted and is of lower relative density than the sand that is traditionally used: water can thus pass through it more easily, giving rise to greater filtering capacity given the physicochemical properties of pozzolan as outlined above.

As shown in FIG. 1, the circuit 5 for regenerating and recycling the water contained in the storage reservoir 1 such as a swimming pool thus comprises at least one circulation pump 11, at least two if not three filters, one, if not two of which are placed upstream from the pump 11 and comprise prefilters 4, 4', 10, 10' as described above, while the other filter is placed downstream at 15 and comprises a filter capacity as described above.

The circuit upstream from the pump 11 may also include, in parallel with the circuit $5_1$ coming from the skimmers 2 or other surface water recovery gulley, an emptying or recirculating duct 6 for taking water from the bottom of the basin 1 and including a switch box 7 making it possible either to empty the basin or else to send all of the water in the basin through the filter circuit $5_2$ so as to regenerate all of the water in the basin 1, and not only the surface water.

The circuit $5_2$ situated downstream from the pump 11 also includes, in conventional manner, a four-port valve 14 enabling various types of connection to be made between the four water inlets and outlets comprising: inlet $5_2$ from the filter circuit itself; water inlet 12 to said filter 15; outlet $13_1$ from said filter (which outlet and inlet may, incidentally, be interchanged); and the return $13_2$ to the reservoir 1 via the remainder of the additional treatment elements, where applicable, which may be concerned with providing chemical treatment rather than physical treatment of the fluid, or exhausting the fluid to some other external circuit, e.g. when it is desired to rinse the capacity 15. These various connections concerning the use of the installation are known in existing systems for which the cartridges and filters of the present invention can be adapted without great difficulty.

Figure 7:
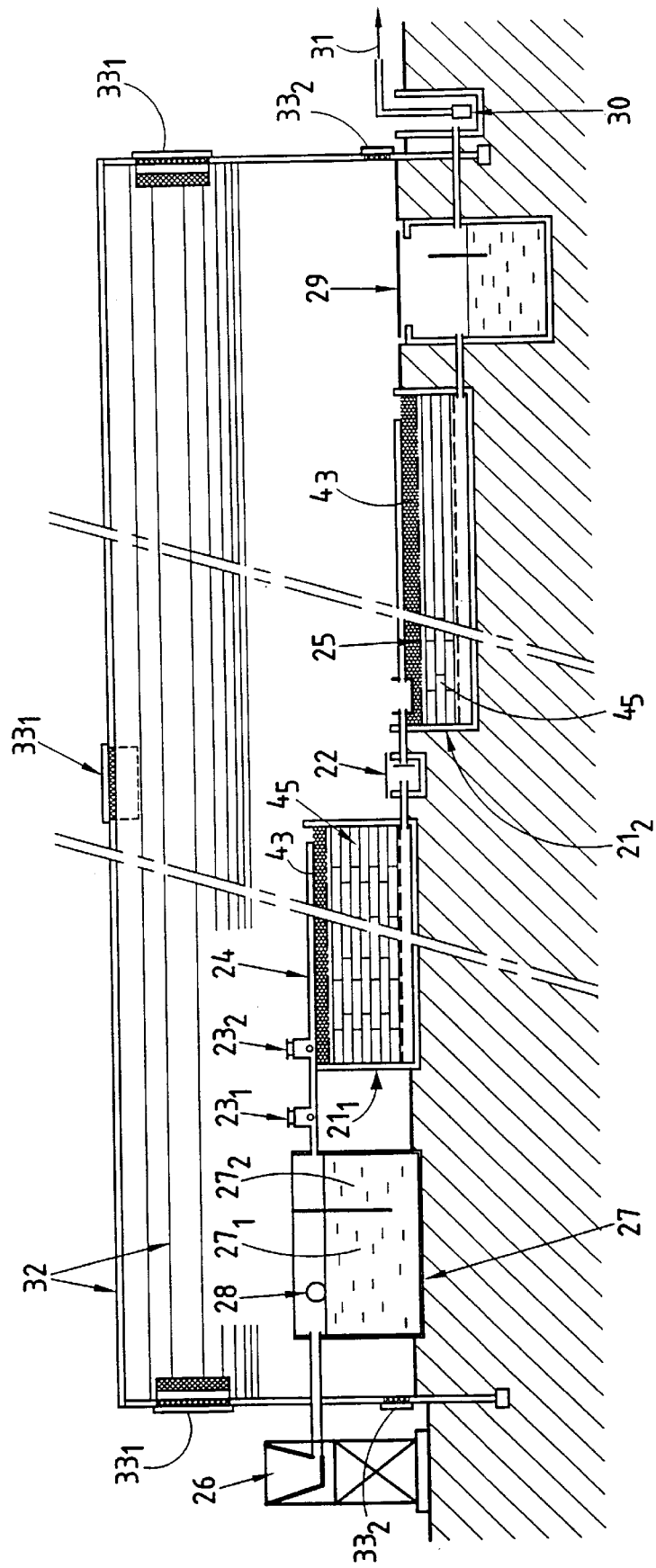
FIG. 7 is a diagrammatic section view of an effluent filter installation comprising a system made up of filter cartridges and elements of the invention.

As shown in FIGS. 7 and 9, when treating effluents of various origins, such as those mentioned in the introduction, the invention provides for said effluents to be filtered by causing them to percolate through a series of superposed layers or beds of filter cartridges $4_5$ contained in at least one leakproof tank 21 placed on the ground or buried, and preferably through two such tanks in series. In the embodiments of FIGS. 7 to 12, said filter cartridges $4_5$ are in the form of a rectangular blocks as described in above-mentioned French patent application FR 2 744 154, and contain pozzolan having a grain size smaller than 25 mm, selected as a function of the application and of availability in the quarry that supplies the pozzolan, and with perforation holes through their walls that receive the effluents, and specifically the top walls when vertical flow under gravity is used: the dimensions or aperture diameters of the holes are all smaller than the dimensions of the smallest grains contained in the cartridge, and that is why they are referred to as "microholes", having a size of 3 mm to 10 mm for the range of grain sizes given above; in the opposite face through which the effluent flows out, the perforation holes are of smaller size, of the order of 1 mm to 3 mm so as to obtain greater control over the distribution of effluent flow through the entire volume represented by said cartridges in the tanks 21.

The cartridges are preferably disposed in two tanks that are connected in series, firstly to avoid having too great a height of superposed cartridges, and secondly to have a manhole 22 between said tanks in order to inspect, adjust, and possibly add to the effluent treatment, e.g. by adding a special treatment such as a chemical treatment, a bacteriological treatment, or an enzymatic treatment.

Figure 8:
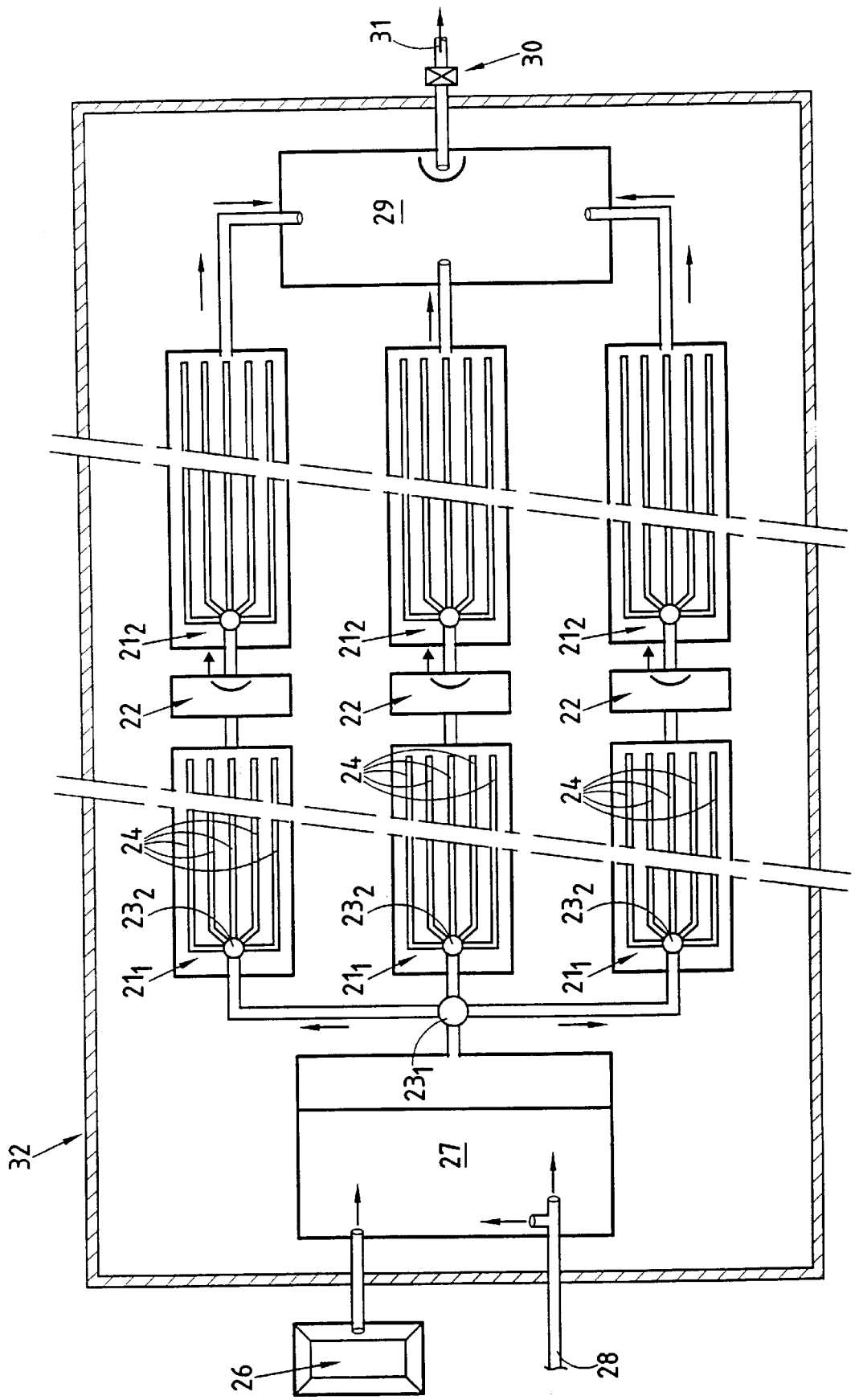
FIG. 8 is a plan view of the FIG. 7 installation.

The height, length, and width dimensions of the set of tanks which may be disposed, for example, in three parallel circuits as shown in FIG. 8, need to be adapted as a function of the nature and the volume of effluent to be treated and as a function of the space available for making such water works.

In order to avoid using motors such as pumps, said tanks are preferably made so as to enable the effluent that is to be filtered to flow under gravity: successive tanks are then disposed in cascade below one another.

To enable percolation, first filtering, and a good distribution of effluent at the high end of the filter tanks 21 to take place effectively, a system of distributor manholes $23_2$ and of perforated pipes 24 serve to spray a pozzolan sand $4_3$ of grain size smaller than or equal to 4 mm, and preferably lying in the range 0.2 mm to 2 mm, which is uniformly distributed over the surface of an engineering textile 25 covering the top or last layer of cartridges $4_5$ in each tank 21: said sand $4_3$ constitutes a uniform layer having a maximum thickness equal to that of a cartridge $4_5$, for example, to avoid excessively increasing headloss and excessively slowing down effluent flow, and it serves to distribute the effluent uniformly over the entire surface of the tanks 21; said engineering textile 25 prevents the sand $5_3$ creeping and enables the effluent to diffuse uniformly towards the filter cartridges $4_5$; said engineering textile can also be replaced by cartridges that do not have a top face.

This filter system of the invention having two successive tanks is included in a more general filter circuit comprising an effluent receiving funnel 26, a tank 27 for slowing down the flow and comprising two compartments $27_1$ and $27_2$ which are designed either to allow heavy elements in suspension to settle with the effluent that has been subjected to said settling then being sent on to the filter system, or else to receive a dilution system by means of stirring that may be performed, for example, with a jet 28 of water at low pressure.

On leaving the buffer tank 27, a distribution manhole system $23_1$ makes it possible, where necessary and depending on the volume and the nature of the effluent, to direct and distribute it to one or more filter systems.

At the outlet from the second tank $21_2$, although there could be other successive tanks in cascade, a sealed retention tank 29 serves to store temporarily the filtered effluent which may be extracted, for example, by means of a pump 30 and directed to disposal pipes 31, e.g. for final manuring or for watering purposes or into the environment, or even for recycling . . . .

Depending on the nature of the effluent to be filtered, a sealed cover 32 covers the installation or only its tanks: an example is of the barn type or of the agricultural tunnel glasshouse type, provided with low and high ventilation using anti-odor filters 33, as shown in FIG. 7; small concrete slabs, cast iron buffers, sheet metal caps, etc. can also cover the tanks on their own in installations of smaller size, as shown in FIG. 9.

In this figure, the manhole 22 between the two tanks 21 may have top ventilation.

Figure 10:
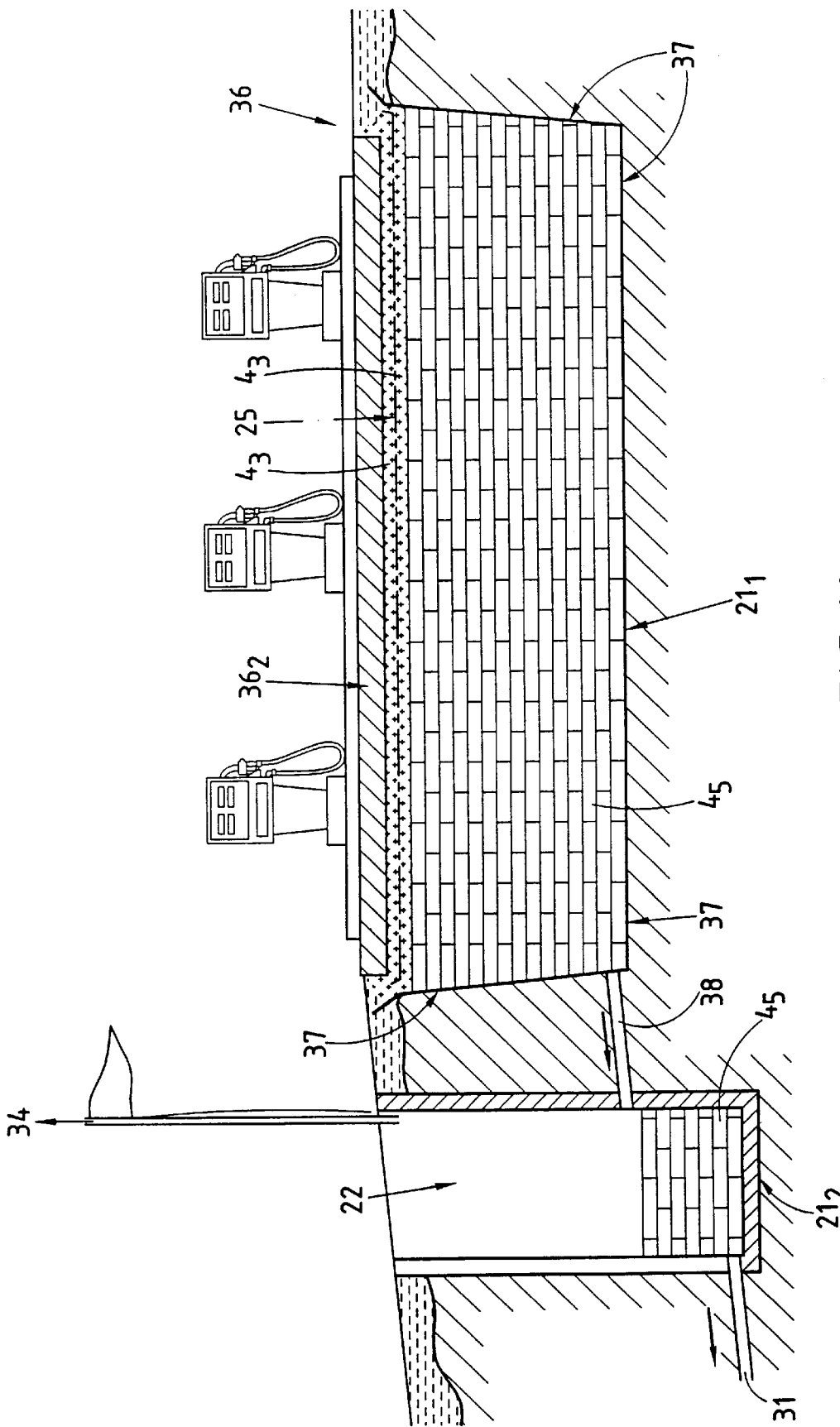

As shown in FIGS. 10 and 11, the arrival of effluent coming from rainwater that has washed over the forecourt 36 of a fuel station percolates through the concrete slabs $36_2$ constituting the forecourt.

In FIG. 10, the filter system of the invention is buried beneath said fuel station forecourt and comprises, beneath the concrete slab $36_2$, a layer of pozzolan sand $4_3$ followed by an engineering textile 25 that is sandwiched against a second layer of pozzolan sand $4_3$ placed on a series of beds of filter cartridges $4_5$ containing pozzolan having a grain size that is smaller than or equal to 25 mm. The entire filter system is kept separate from the surrounding ground by a leakproof engineering sheet 37 that is previously placed on the prepared and smoothed ground of a pit that than receives all of the above filter elements.

A pipe 38 situated in the bottom of the installation serves to remove the water filtered in this way towards a second tank $21_2$ also acting as an inspection manhole 22 and having a further series of beds of cartridges $4_5$: after this second filtering, the residual effluent is removed to any appropriate rejection device 31; the second tank $21_2$ has a vent 34 disposed at the top of a mast for ventilating bad smells, which mast can also serve as a flagpole.

As shown in FIG. 11, the circuit for recovering rainwater that has rinsed said fuel station forecourt 36 includes a sanitary type empty space 39 under said concrete slab $36_2$ and supported on low walls 40 having bottom holes 41 level with a lower support slab 42 that is waterproof. This sanitary type empty space 39 serves to recover the water that percolates through the top slab $36_2$ from the fuel station forecourt $36_1$ which is mixed with any hydrocarbons that may have dripped onto the forecourt. Then, by means of a slope that is sufficient, and in any event necessary for the above-described set of tanks 21, the effluent is sent via a waste pipe 38 towards one of the systems as described above with reference to FIGS. 7 to 10.

Figure 12:
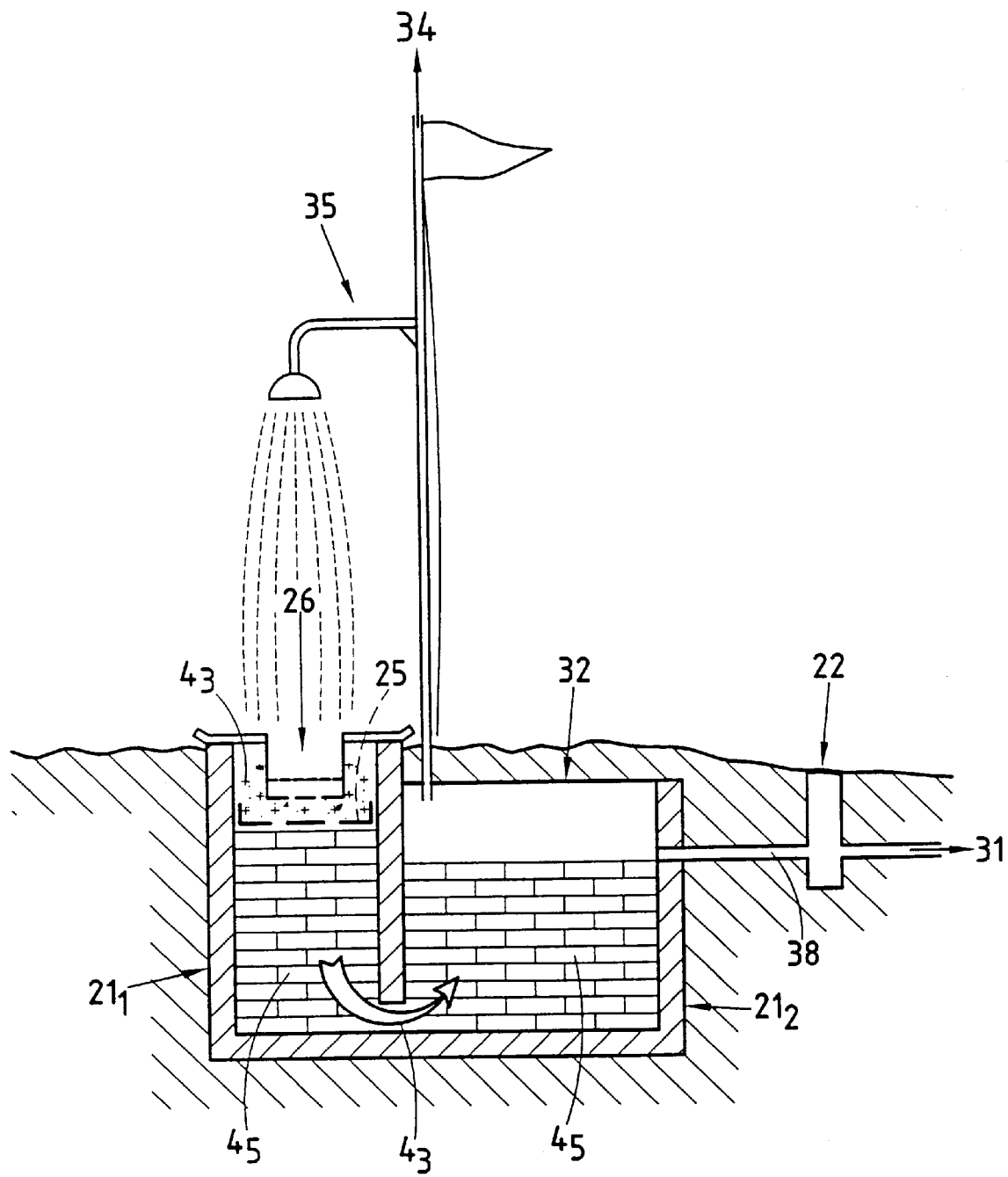
FIG. 12 is a simplified section view of a filter system of the invention including a "siphon" in the water flow path.

As shown in FIG. 12, in some cases where the available space or the possible disposal slopes are insufficient to allow two tanks to be placed in cascade so that the effluent can pass through the pozzolan under gravity, it is possible to make said two tanks communicate via a siphon 43. In this case, some of the filtering in the first tank $21_1$ is performed by percolation through all of the beds of its filter cartridges $4_5$ and then by the siphon effect through the bottom beds of filter cartridges $4_5$ in the following tank $21_2$, and is then performed by rising through all the layers of filter cartridges in said second tank, until it reaches the removal pipe 38.

Such a disposition is adapted, for example, for use with a beach shower 35 with the waters that are filtered in this way subsequently being disposed of directly into the sea 31. The inspection manhole 22 is then located on the removal pipe 38 and the shower 35 may be fixed to a mast that includes the odor removal vent 34 of the second tank $21_2$, which mast may also act as a flagpole.

What is claimed is:

1. A method for filtering a liquid containing solids comprising passing the liquid through an envelope comprising one and only one material for filtering the liquid, said material being granular pozzolan having a relative density of less than 1 g/cm$^3$ and a grain size of less than or equal to 25 mm.

2. In a method for filtering solids from a liquid in a reservoir, wherein the liquid is continually circulated from the reservoir through a circuit comprising a filter with a filter material consisting of sand and back to the reservoir such that solids in the liquid are continually trapped and retained in the filter material with a concomitant loss of head in the circuit, the improvement wherein the filter material is granular pozzolan having sufficient grain size and density to trap and retain the solids with a reduced loss of head in the circuit.

3. A method as claimed in claim 2, wherein the liquid is continually circulated through two filters comprising granular pozzolan, a first filter comprising granular pozzolan with a grain size smaller than or equal to 4 mm and a second filter comprising granular pozzolan with a grain size between 2 mm to 20 mm.

4. In a filter system for physically treating liquid comprising at least one envelope and an inert granular material enclosed in the at least one envelope such that liquid flowing through the at least one envelope passes through said material, the improvement wherein the material is of cellular structure, of relative density less than 1 g/cm$^3$, and is granular pozzolan having a grain size that is less than or equal to 25 mm.

5. A filter system according to claim 4, wherein said envelope is a filter cartridge having at least two parallel perforated faces and containing pozzolan, the pozzolan in said cartridge being disposed in at least a first layer parallel to said faces and perpendicular to an axis of the container alone which the liquid flows.

6. A filter system according to claim 5, including at least a second layer of pozzolan having pozzolan with a different grain size than pozzolan in the first layer, said second layer being disposed downstream of the first layer relative to a direction of flow of the liquid and being constituted by pozzolan having fine grains of grain size smaller than 4 mm, while the first layer is constituted by coarse grains of grain size less than or equal to 25 mm, said first layer, at least, being contained in said filter cartridge.

7. A filter system according to claim 5, including at least one tank containing a plurality of superposed layers of pozzolan.

8. A filter system according to claim 5, wherein the filter cartridge includes surfaces defining a hollow passage on the axis perpendicular to said perforated parallel faces, the surfaces of said hollow passage and an outside surface of the cartridge being perforated.

9. A filter system according to claim 4, wherein said envelope comprises a leakproof portion that includes at least one liquid inlet orifice adjacent a first end thereof and an outlet orifice adjacent a second end remote from the first end, said portion being filled with grains of pozzolan having a grain size less than or equal to 25 mm, and including at least one internal mixing arm situated between the inlet and outlet orifices.

10. A filter system according to claim 4, comprising a storage reservoir, circuit means for regenerating and recycling water contained in the storage reservoir and at least one circulation pump.

11. A filter system according to claim 10, wherein said water storage reservoir is a swimming pool comprising water and a water inlet to the pump, said water inlet comprising at least one duct with an orifice located at the same level as a surface of the water in the pool and including screen means comprising a basket for recovering waste.

12. A filter system according to claim 4, comprising effluent filter circuit means, including said envelope, for allowing effluent to percolate, and to pass under gravity through the pozzolan, said circuit means comprising at least two tanks in series each containing said pozzolan.

13. A filter system according to claim 10, comprising a first filter disposed upstream of the at least one circulation pump and a second filter disposed downstream of the at least one circulation pump, said first filter comprising a filter cartridge having at least two parallel perforated faces and containing pozzolan, the pozzolan in the cartridge being disposed in at least a first layer parallel to said faces and perpendicular to an axis of the container along which the liquid flows.

14. A filter system according to claim 13, wherein the second filter comprises a leakproof portion that includes at least one liquid inlet orifice adjacent a first end thereof and an outlet orifice adjacent a second end remote from the first end, said portion being filled with grains of pozzolan having a grain size less than or equal to 25 mm, and including at least one internal mixing arm disposed between the inlet and outlet orifices.

15. A filter system according the claim 11, comprising a filter cartridge having at least two parallel perforated faces and containing pozzolan, the pozzolan in the cartridge being disposed in at least a first layer parallel to said faces and perpendicular to an axis of the container along which the liquid flows.

* * * * *